(12) United States Patent
Laberge et al.

(10) Patent No.: US 8,570,286 B2
(45) Date of Patent: Oct. 29, 2013

(54) GESTURES ON A TOUCH-SENSITIVE DISPLAY

(75) Inventors: Jason Laberge, New Brighton, MN (US); Pallavi Dharwada, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 931 days.

(21) Appl. No.: 12/704,886

(22) Filed: Feb. 12, 2010

(65) Prior Publication Data

US 2011/0199314 A1 Aug. 18, 2011

(51) Int. Cl.
*G06F 3/041* (2006.01)

(52) U.S. Cl.
USPC .......................................... 345/173; 345/156

(58) Field of Classification Search
USPC .......... 345/156–159, 173, 178; 715/722, 756, 715/823, 862, 863
See application file for complete search history.

(56) References Cited

U.S. PATENT DOCUMENTS

| | | | |
|---|---|---|---|
| 4,992,866 A | 2/1991 | Morgan | |
| 5,483,261 A | 1/1996 | Yasutake | |
| 5,872,594 A | 2/1999 | Thompson | |
| 6,208,329 B1 | 3/2001 | Ballare | |
| 6,542,191 B1 | 4/2003 | Yonezawa | |
| 6,680,746 B2 | 1/2004 | Kawai et al. | |
| 6,697,105 B1 | 2/2004 | Kato et al. | |
| 6,888,565 B1 | 5/2005 | Tanaka et al. | |
| 6,954,224 B1 | 10/2005 | Okada et al. | |
| 6,965,376 B2 | 11/2005 | Tani et al. | |
| 6,965,394 B2 | 11/2005 | Gutta et al. | |
| 6,973,200 B1 | 12/2005 | Tanaka et al. | |
| 7,030,861 B1 | 4/2006 | Westerman et al. | |
| 7,061,525 B1 | 6/2006 | Tanaka et al. | |
| 7,183,944 B2 | 2/2007 | Gutta et al. | |
| 7,278,115 B1 | 10/2007 | Conway et al. | |
| 7,362,221 B2 | 4/2008 | Katz | |
| 7,394,367 B1 | 7/2008 | Aupperle et al. | |
| 7,411,575 B2 | 8/2008 | Hill et al. | |
| 7,479,949 B2 | 1/2009 | Jobs et al. | |
| 7,519,223 B2 | 4/2009 | Dehlin et al. | |
| 7,535,463 B2 | 5/2009 | Wilson | |
| 2001/0026263 A1 | 10/2001 | Kanamori et al. | |
| 2002/0067412 A1 | 6/2002 | Kawai et al. | |
| 2005/0036036 A1 | 2/2005 | Stevenson et al. | |
| 2005/0079896 A1 | 4/2005 | Kokko et al. | |
| 2005/0225634 A1 | 10/2005 | Brunetti et al. | |
| 2006/0026521 A1 | 2/2006 | Hotelling et al. | |

(Continued)

FOREIGN PATENT DOCUMENTS

WO  WO-1998049663 A1  11/1998

OTHER PUBLICATIONS

"U.S. Appl. No. 12/704,950, Advisory Action mailed May 8, 2012", 5 pgs.

(Continued)

*Primary Examiner* — Ricardo L Osorio
(74) *Attorney, Agent, or Firm* — Schwegman Lundberg & Woessner, P.A.

(57) ABSTRACT

A method of showing content on a touch-sensitive display. The method includes showing content on a touch-sensitive display and detecting contact with the touch-sensitive display. The method further includes manipulating the content on the touch-sensitive display based on gestures performed on the touch-sensitive display.

4 Claims, 20 Drawing Sheets

(56) References Cited

U.S. PATENT DOCUMENTS

| | | | |
|---|---|---|---|
| 2006/0034043 A1 | 2/2006 | Hisano et al. | |
| 2006/0036944 A1 | 2/2006 | Wilson | |
| 2006/0187196 A1 | 8/2006 | Underkoffler et al. | |
| 2007/0146337 A1 | 6/2007 | Ording et al. | |
| 2007/0171273 A1 | 7/2007 | Saleh et al. | |
| 2007/0229471 A1* | 10/2007 | Kim et al. | 345/173 |
| 2008/0013826 A1 | 1/2008 | Hillis et al. | |
| 2008/0129686 A1 | 6/2008 | Han | |
| 2008/0143559 A1 | 6/2008 | Dietz et al. | |
| 2008/0168403 A1 | 7/2008 | Westerman et al. | |
| 2008/0231610 A1 | 9/2008 | Hotelling et al. | |
| 2009/0040188 A1 | 2/2009 | Shu | |
| 2009/0084612 A1 | 4/2009 | Mattice et al. | |
| 2009/0160785 A1 | 6/2009 | Chen et al. | |
| 2009/0262091 A1 | 10/2009 | Ikeda et al. | |
| 2010/0053219 A1 | 3/2010 | Kornmann | |
| 2010/0138763 A1* | 6/2010 | Kim | 715/765 |
| 2010/0188423 A1 | 7/2010 | Ikeda et al. | |
| 2010/0192109 A1* | 7/2010 | Westerman et al. | |
| 2010/0211920 A1* | 8/2010 | Westerman et al. | 715/863 |
| 2010/0304731 A1 | 12/2010 | Bratton et al. | |
| 2011/0093822 A1* | 4/2011 | Sherwani | 715/863 |
| 2011/0117526 A1 | 5/2011 | Wigdor et al. | |
| 2011/0181526 A1* | 7/2011 | Shaffer et al. | 345/173 |
| 2011/0199386 A1 | 8/2011 | Dharwada et al. | |
| 2011/0199495 A1 | 8/2011 | Laberge et al. | |
| 2011/0199516 A1 | 8/2011 | Laberge et al. | |
| 2011/0225553 A1 | 9/2011 | Abramson et al. | |
| 2011/0239155 A1* | 9/2011 | Christie | 715/784 |
| 2012/0023509 A1 | 1/2012 | Blumenberg | |
| 2012/0088526 A1* | 4/2012 | Lindner | 455/457 |
| 2012/0242850 A1 | 9/2012 | Laberge et al. | |

OTHER PUBLICATIONS

"U.S. Appl. No. 12/704,950, Final Office Action mailed Mar. 8, 2012", 9 pgs.

"U.S. Appl. No. 12/704,950, Non Final Office Action mailed Jun. 15, 2012", 9 pgs.

"U.S. Appl. No. 12/704,950, Non Final Office Action mailed Dec. 6, 2011", 5 pgs.

"U.S. Appl. No. 12/704,950, Response flied Jan. 12, 2012 to Non Final Office Action mailed Dec. 16, 2011", 8 pgs.

"U.S. Appl. No. 12/704,950, Response filed Apr. 25, 2012 to Final Office Action mailed Mar. 8, 2012", 8 pgs.

"U.S. Appl. No. 12/704,950, Supplemental Amendment and Response filed Jun. 7, 2012 to Final Office Action mailed Mar. 8, 2012 and Advisory Action mailed May 8, 2012", 10 pgs.

"U.S. Appl. No. 12/704,987, Examiner Interview Summary mailed Aug. 23, 2012", 3 pgs.

"U.S. Appl. No. 12/704,987, Non Final Office Action mailed Jul. 20, 2012", 8 pgs.

"U.S. Appl. No. 12/704,987, Response filed Aug. 17, 2012 to Non-Final Office Action mailed Jul. 20, 2012", 6 pgs.

"Atmel's New Family of Touch Screen Solutions Enable Two Touch Gestures for Intuitive User Interfaces", http://news.thomasnet.com/companystory/821709, (Oct. 22, 2008).

"Getac Announces Technology Breakthrough With Resistive-Type Multi-Touch Technology for "Hands-On" Applications With or Without Gloves", http://www.getac.com/news/edm/multi-touch.html, Getac Press Release, (Oct. 6,2009).

"HTC TouchFLO review", Mp://msmobiles.com/news.php/6616.html, (Aug. 16, 2007).

"Touch Screen and User Interface", http://www.sony.jp/products/overseas/contents/pickup/contents/touch screen/index.html, Undated, (Downloaded Oct. 9,2009).

"TOUCH1600 Touch Screen DVR", http://helpdesk.portasystems.com/download/security/dvr.pdf, Porta Systems Corp., (Sep. 2008).

Davies, Chris, "Getac V100 Tablet PC gets glove-friendly multitouch display", http://www.slashgear.com/getac-v100-tablet-pc-gets-glove-friendly-multitouch-display-0759517/, (Oct. 7, 2009).

Niper, E. D, "INEL central alarm monitoring and assessment system", *Nuclear materials mangament*, 12, (1983), 150-155.

Posey, Brien, "Touch screen gestures", http://itknowledgeexchange.techtarget.com/brien-posey/touch-screen-gestures/, Brien Posey's Windows Blog, (Mar. 31, 2009).

"U.S. Appl. No. 12/704,950, Final Office Action mailed Oct. 4, 2012", 10 pgs.

"U.S. Appl. No. 12/704,950, Response filed Sep. 14, 2012 Non Final Office Action mailed Jun. 15, 2012", 10 pgs.

"U.S. Appl. No. 12/704,987, Final Office Action mailed Nov. 13, 2012", 9 pgs.

"U.S. Appl. No. 12/704,987, Non Final Office Action mailed Jan. 1, 2013", 9 pgs.

"U.S. Appl. No. 12/704,987, Response filed Dec. 3, 2012 to Final Office Action mailed Nov. 13, 2012", 6 pgs.

"U.S. Appl. No. 12/705,026, Final Office Action mailed Feb. 13, 2013", 11 pgs.

"U.S. Appl. No. 12/705,026, Non Final Office Action mailed Nov. 23, 2012", 10 pgs.

"U.S. Appl. No. 12/705,026, Response filed Jan. 2, 2013 to Non Final Office Action mailed Nov. 23, 2012", 9 pgs.

"U.S. Appl. No. 12/705,026 , Response filed Mar. 25, 2013 to Final Office Action mailed Feb. 12, 2013", 5 pgs.

"U.S. Appl. No. 12/705,026, Examiner Interview Summary mailed Mar. 28, 2013", 3 pgs.

"U.S. Appl. No. 12/705,026, Non Final Office Action mailed Apr. 11, 2013", 7 pgs.

"U.S. Appl. No. 12/704,987, Final Office Action mailed Jul. 29, 2013", 9 pgs.

"U.S. Appl. No. 12/705,026, Examiner Interview Summary mailed May 22, 2013", 3 pgs.

* cited by examiner

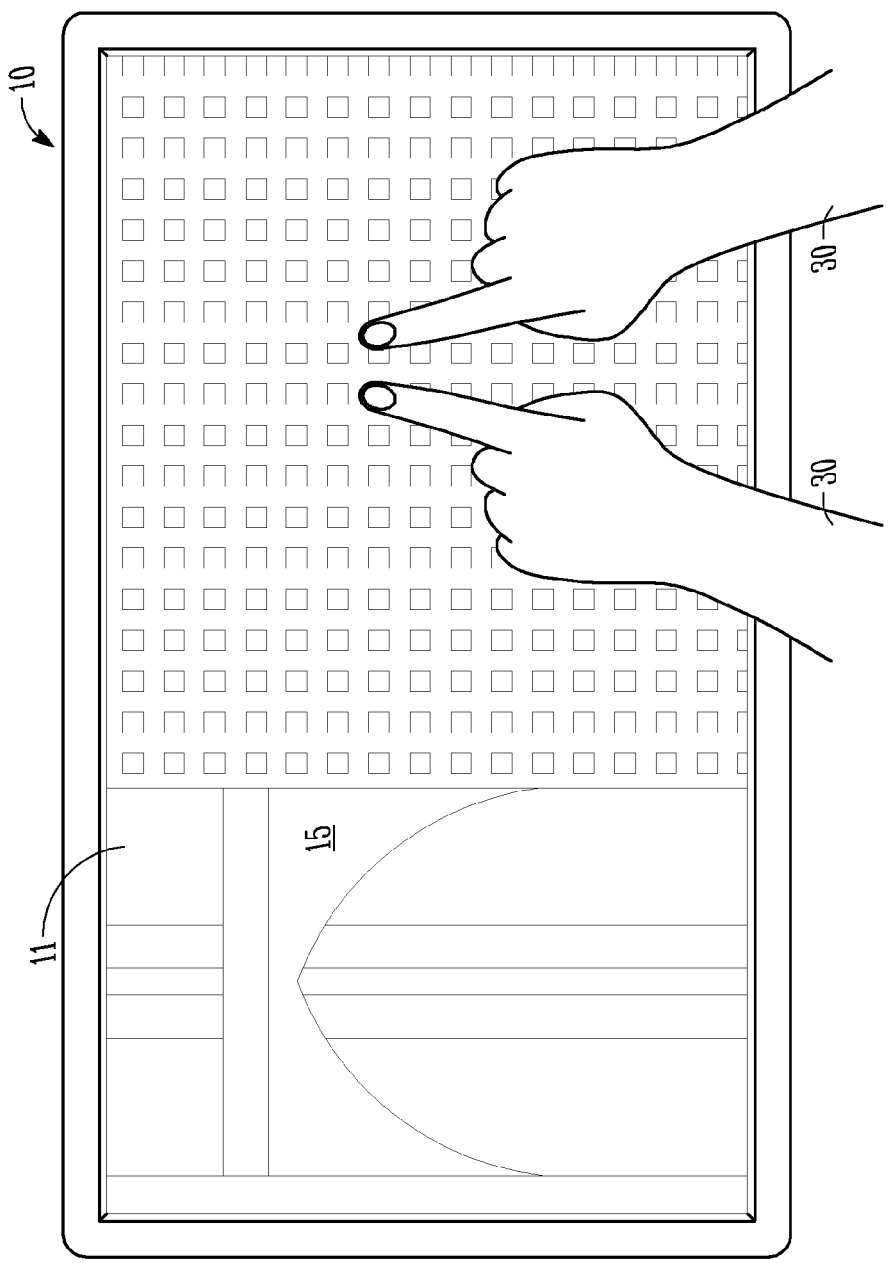

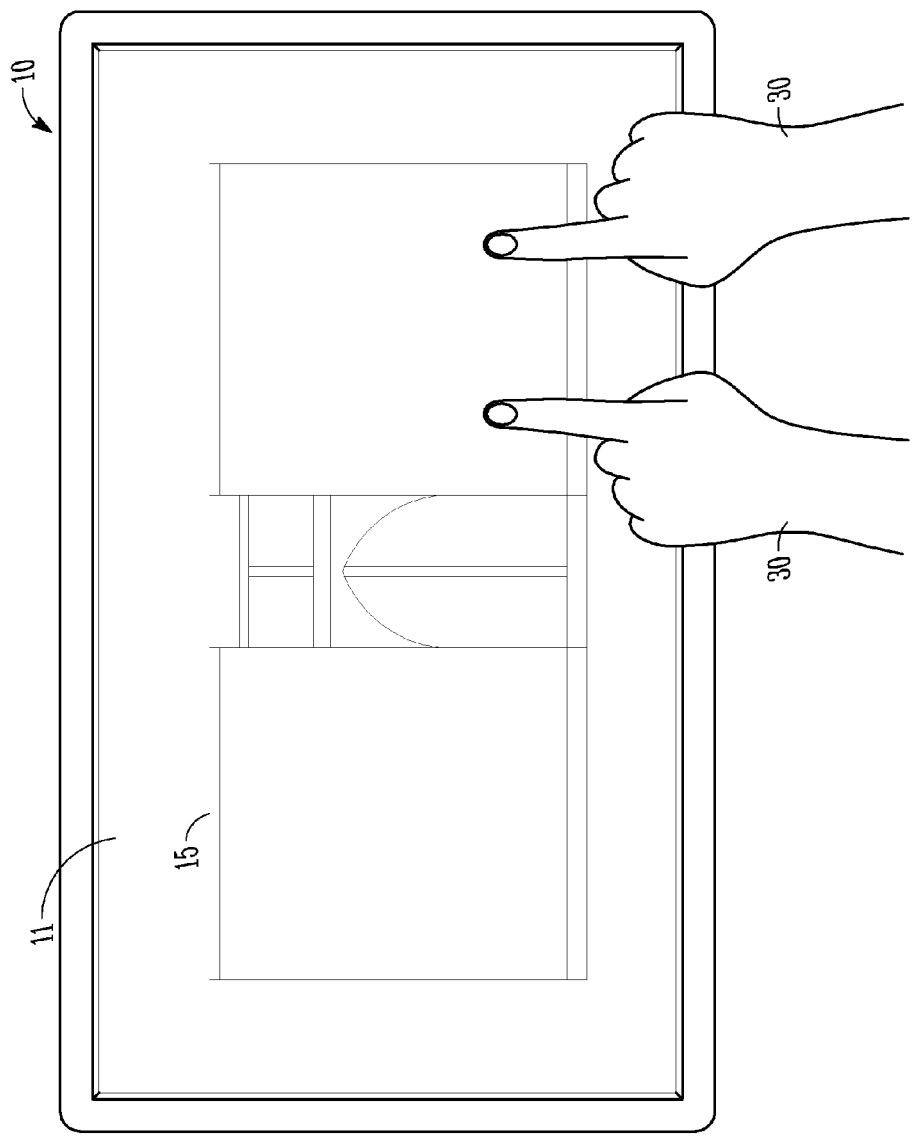

GESTURES ON A TOUCH-SENSITIVE DISPLAY

BACKGROUND

Monitoring large and complex environments is a challenging task for security operators because situations evolve quickly, information is distributed across multiple screens and systems, uncertainty is rampant, decisions can have high risk and far reaching consequences, and responses must be quick and coordinated when problems occur. The increased market present of single-touch and multi-touch interaction devices such as the iPhone, GPS navigators, HP TouchSmart laptop, Microsoft Surface and Blackberry mobile devices offer a significant opportunity to investigate new gesture-based interaction techniques that can improve operator performance during complex monitoring and response tasks.

However, the solutions that are typically incorporated to address the myriad of needs in complex security environments often consist of adding a multitude of features and functions in order to facilitate monitoring the environment using multiple assets. Unfortunately, one consequence of adding additional features in order to facilitate monitoring multiple assets is that operators must remember the features available, including when and how to access them.

BRIEF DESCRIPTION OF THE DRAWINGS

FIGS. 2A-2B illustrate an example method of showing content on a touch-sensitive display that includes changing the zoom of the content by making arc-shaped gestures.

FIGS. 3A-3B illustrate another example method of showing content on a touch-sensitive display that includes changing the zoom of the content by making arc-shaped gestures.

DETAILED DESCRIPTION

In the following description, reference is made to the accompanying drawings that form a part hereof, and in which is shown by way of illustrating specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

As used herein, "content" refers to still video, live video, recorded video, two dimensional maps, three dimensional models, cameras, people, data, equipment or any other asset that can be displayed on a touch-sensitive display.

FIGS. 1A-1E illustrate an example method of showing content 11 on a touch-sensitive display 10. The method includes showing content 11 on the touch-sensitive display 10 where the content 11 includes a two dimensional map of an environment that includes assets 12 to be monitored.

The method further includes selecting some of the assets 12 by contacting the touch-sensitive display 10 (see FIGS. 1A and 1B) and displaying a window 40 (see FIG. 1C) that includes information generated by each of the selected assets 12. Although the assets 12 shown in FIGS. 1A-1E are cameras, other assets may be selected. Some example assets include alarms, sensors, people, data or equipment.

It should be noted that displaying a window 40 that includes information generated by each of the selected assets 12 may includes displaying a plurality of windows that includes information generated by each of the selected assets 12 where each asset provides information to a separate window. In addition, as shown in FIGS. 1C-1E, the window(s) 40 may include information from multiple assets 12.

Figure 1A:
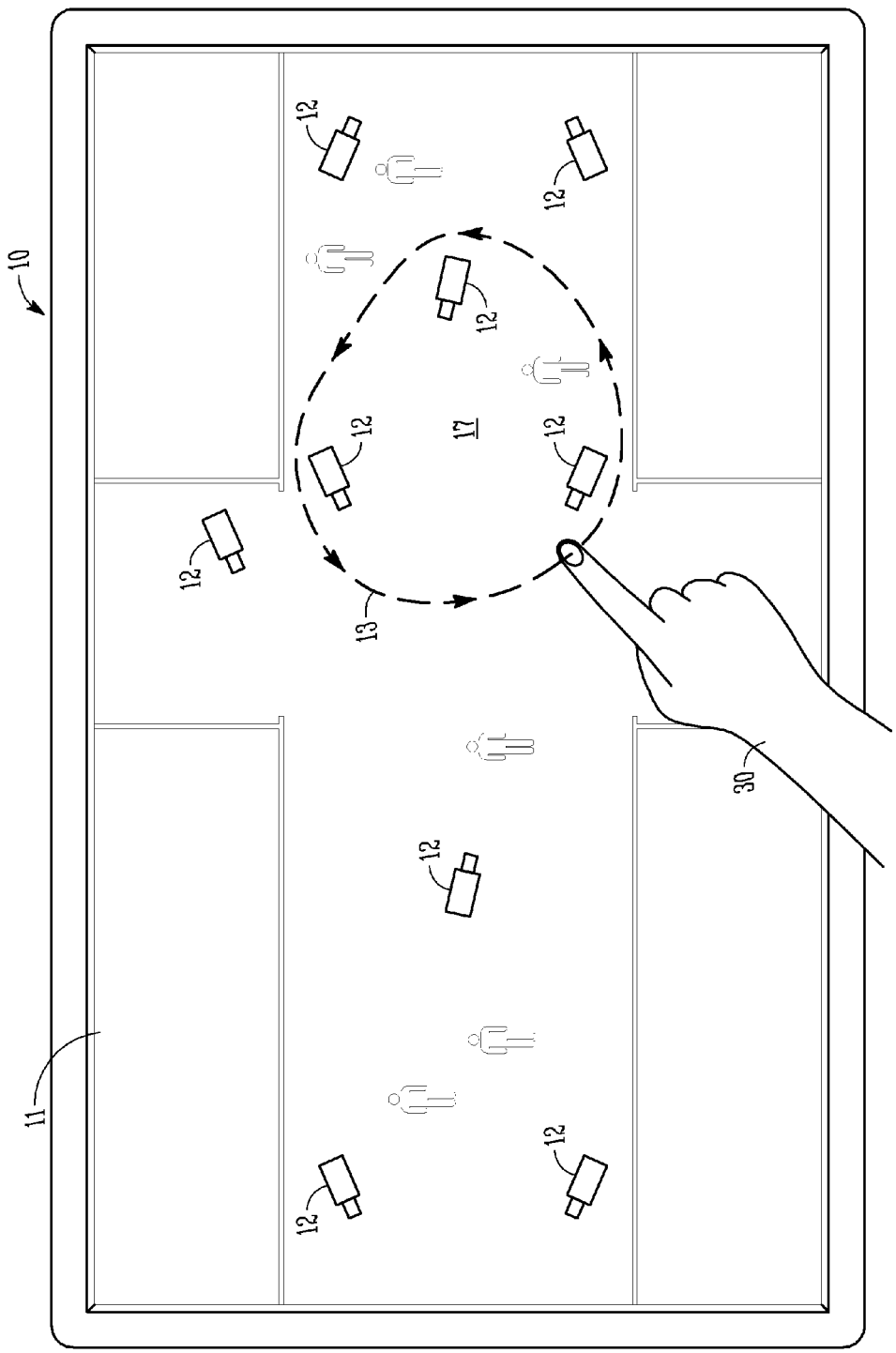
FIGS. 1A-1E illustrate an example method of showing content on a touch-sensitive display where the content includes a two dimensional map of an environment that includes assets to be monitored.
Figure 1B:
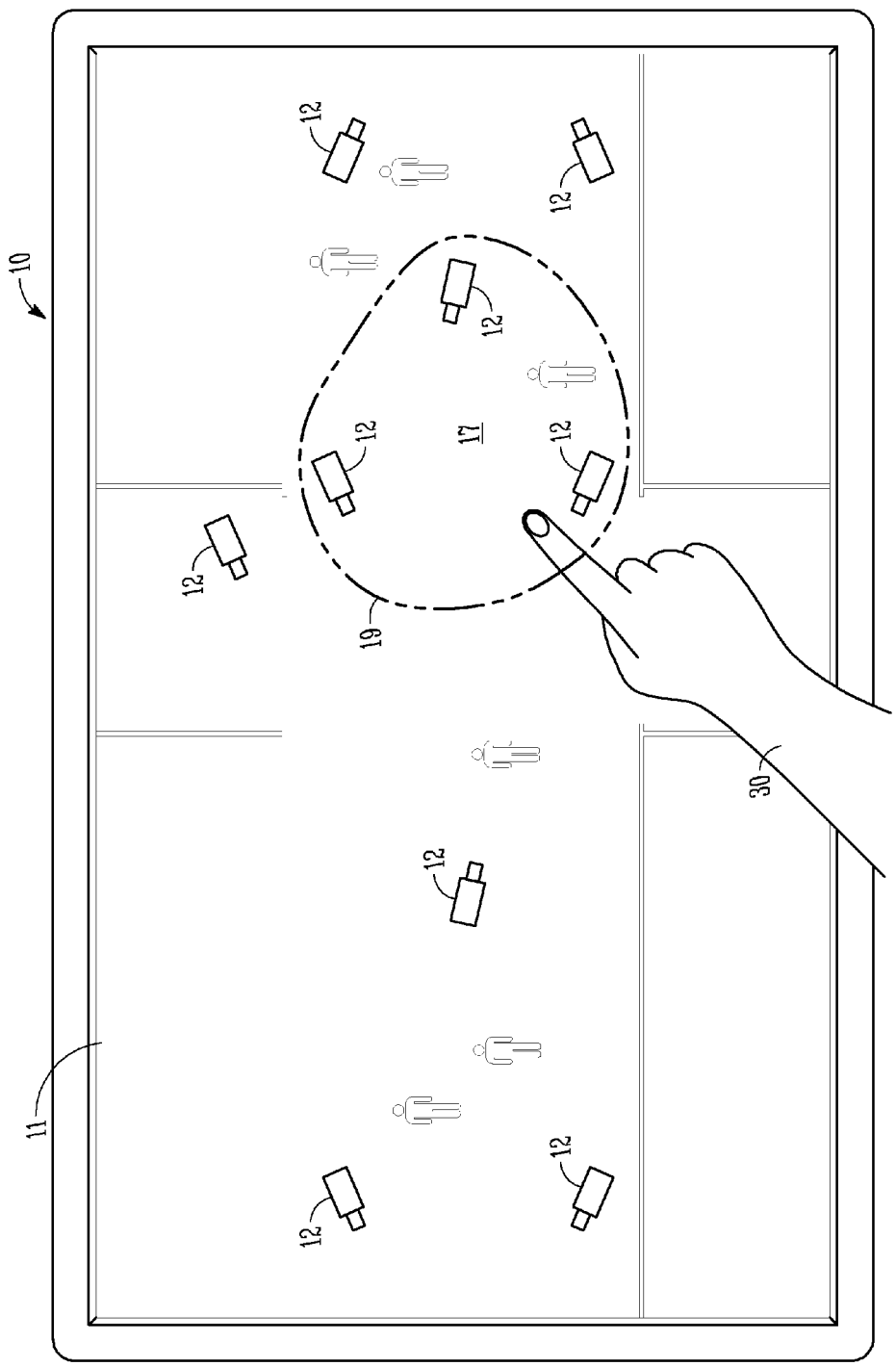
Figure 1C:
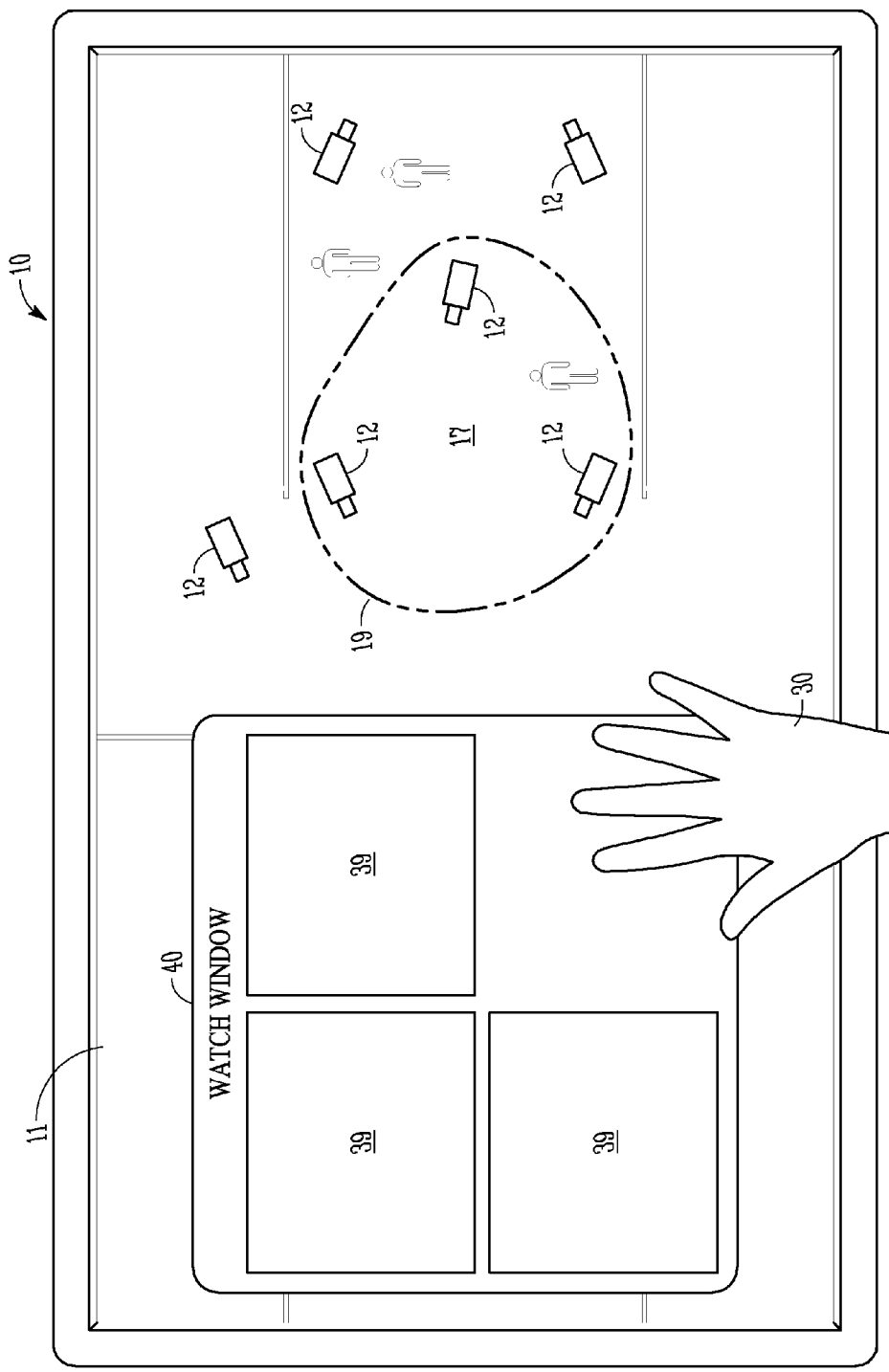

In the example embodiment illustrated in FIGS. 1A-1B, selecting assets 12 by contacting the assets 12 displayed on the touch-sensitive display 10 includes selecting an area 17 by circling the area 17 on the touch-sensitive display 10. It should be noted that the area 17 may be any shape as long the gesture 13 that encircles the area 17 selects the appropriate assets 12.

Figure 1D:
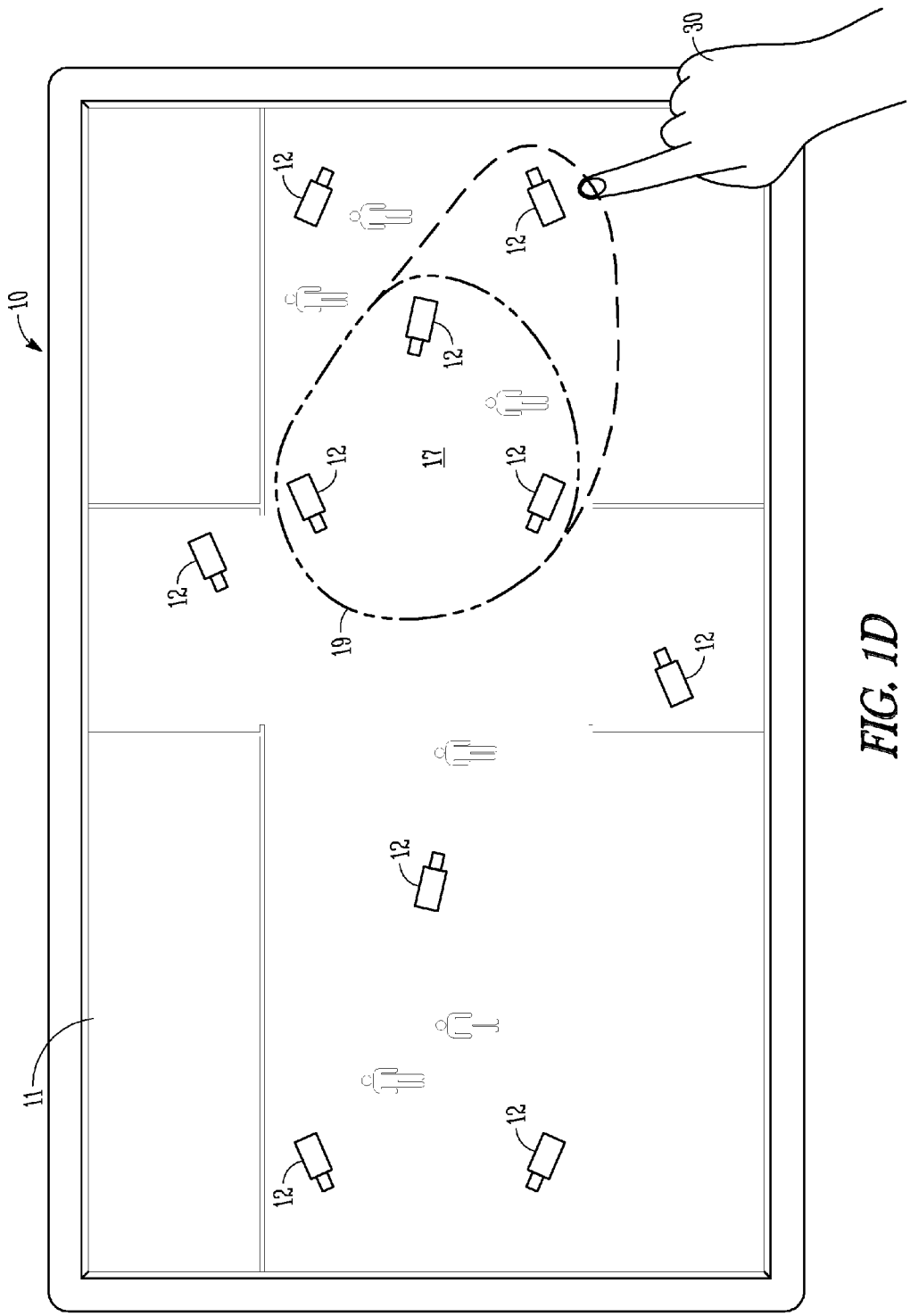
Figure 1E:
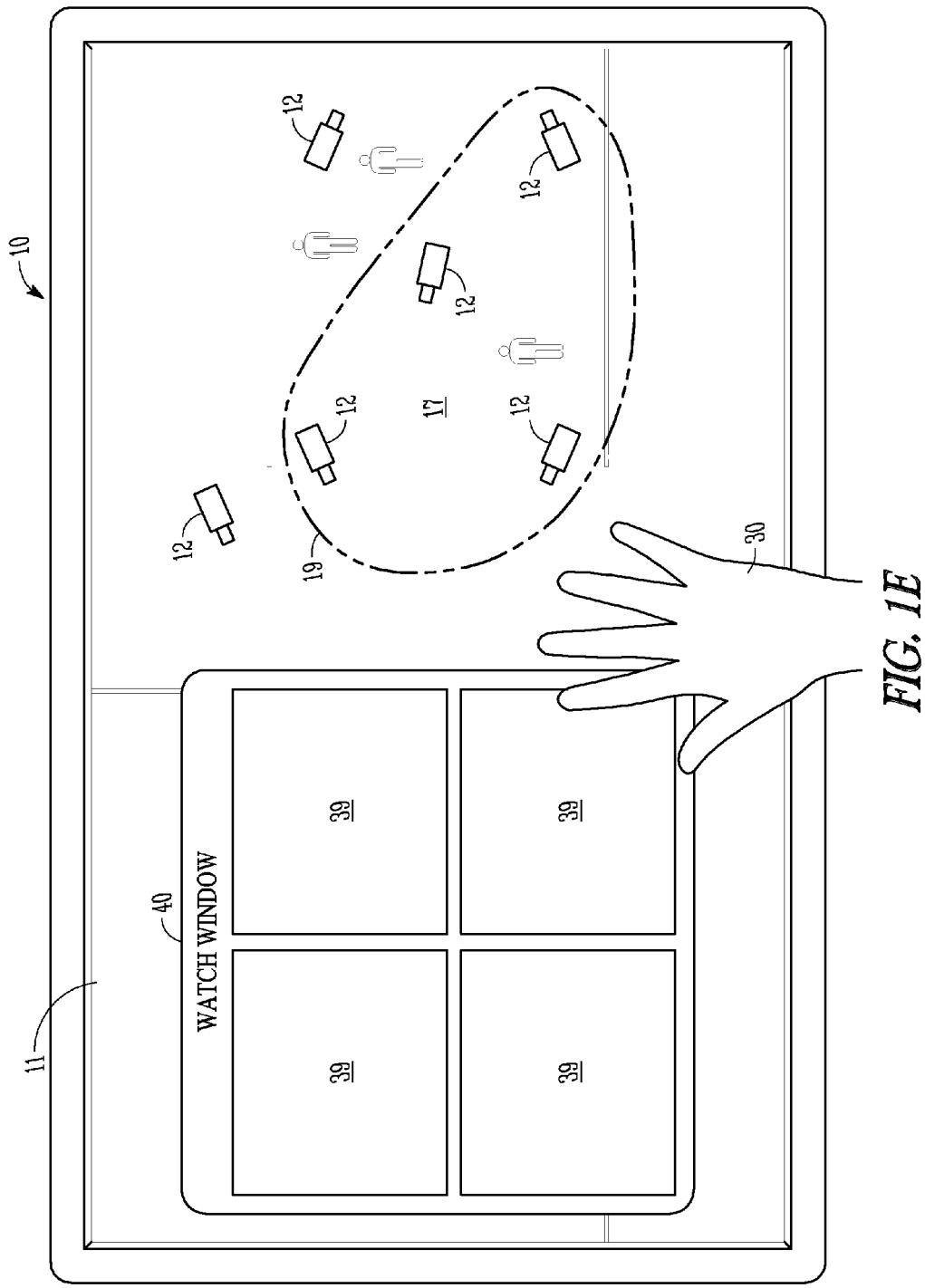

In some embodiments, selecting assets 12 by contacting the assets 12 displayed on the touch-sensitive display 10 may include changing the size of the selected area 17 on the touch-sensitive display 10 that includes the assets 12 (see FIG. 1D). As an example, changing the size of the selected area 17 on the touch-sensitive display 10 that includes the assets 12 may include contacting a displayed boundary 19 of the selected area 17 and manipulating the boundary 19 to add or remove assets 12. It should be noted that the boundary 19 may be manipulated by a variety of gestures as long as the desired assets are selected and/or removed from the area 17.

Figure 2A:
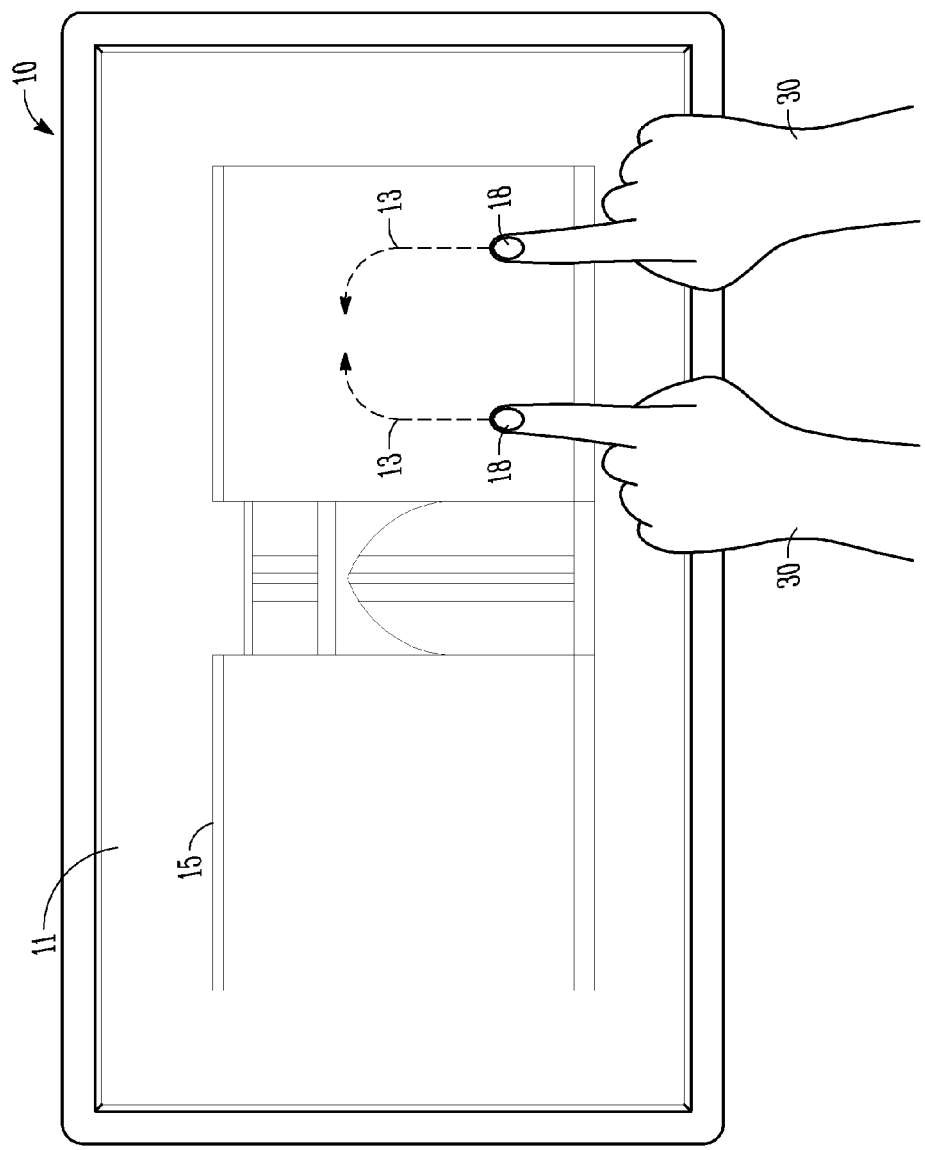

FIGS. 2A-2B illustrate an example embodiment of a method of showing content 11 on a touch-sensitive display 10. As shown in FIG. 2A, the method includes detecting contact at two points 18 on the touch-sensitive display 10. The method further includes changing the zoom of the content 11 on the touch-sensitive display 10 by making an arc-shaped gesture 13 from each point of contact 18.

FIG. 2B shows a user 30 manipulating the zoom level by placing fingers 30 on the two points 18 and moving the fingers 30 in the arc-shaped gestures 13 on the touch-sensitive display 10. In the example embodiment shown in FIG. 2B, moving the fingers 30 upwardly and inwardly toward one another in an arcing motion causes the displayed content 11 to zoom forward toward a subject 15 that is shown on the touch-sensitive display 10.

Figure 3A:
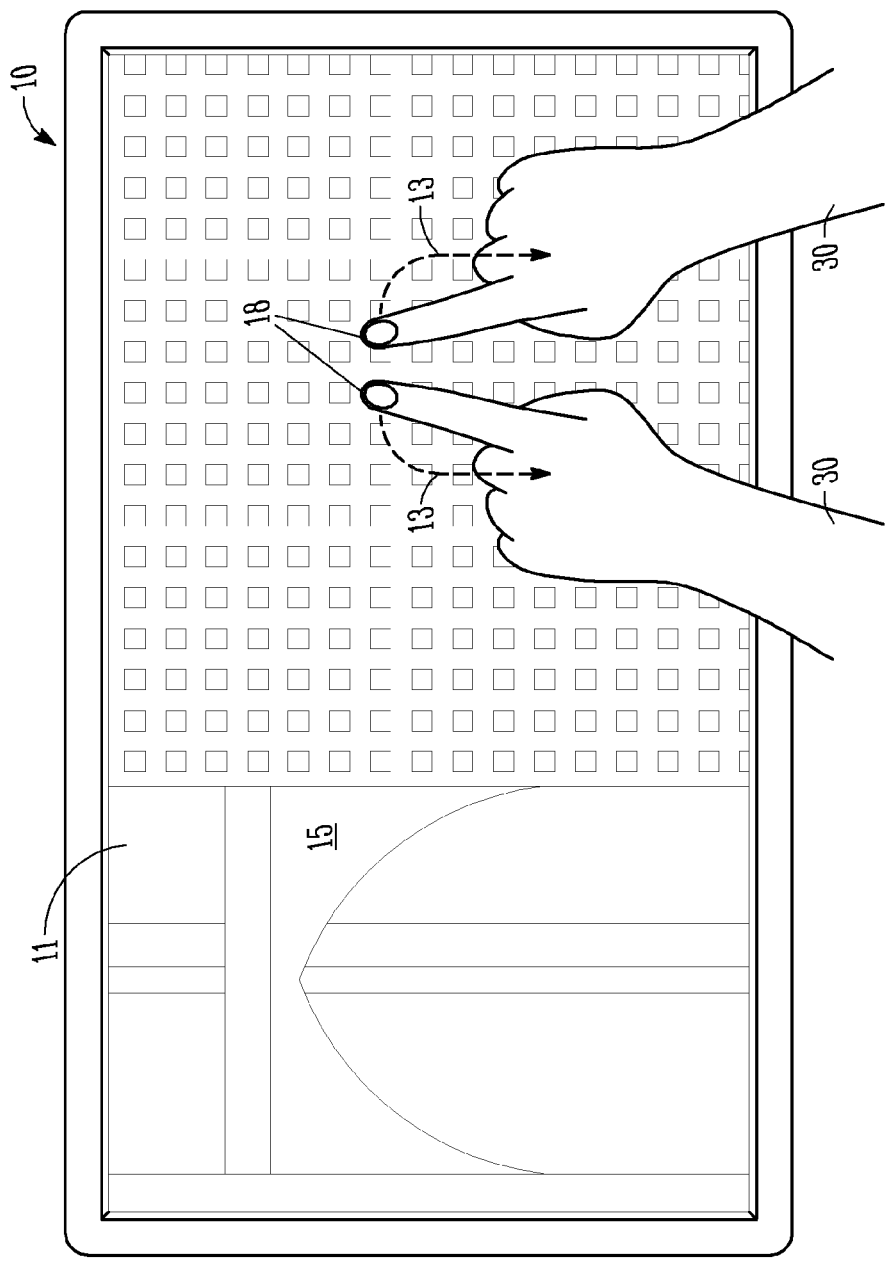

In the example embodiment shown in FIGS. 3A-3B, moving the fingers 30 downwardly and inwardly toward one another in an arcing motion causes the content 11 to zoom away from the subject 15.

In some embodiments, the magnitude of the zoom level change may be based on the length of the arc-shaped gestures 13. It should be noted that the arc-shaped gestures 13 shown in FIGS. 2A-2B and 3A-3B are only examples and other arc shapes may be used. In addition, the zoom level may change as the arc-shaped gestures 13 are being made (i.e., continuous zoom) or after the arc-shaped gestures 13 are made (i.e., step zoom).

Figure 4A:
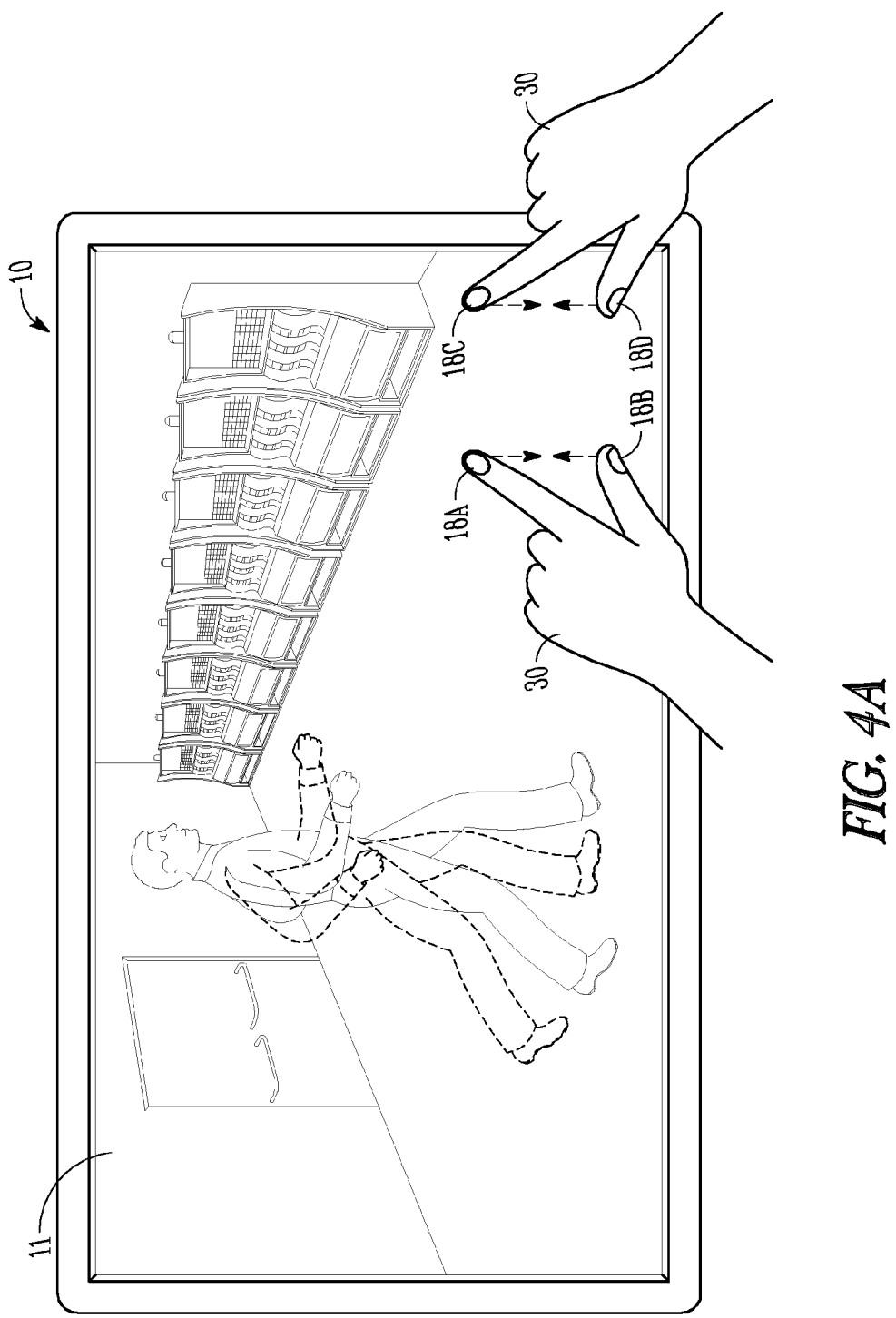
FIGS. 4A-4B illustrate an example method of showing content on a touch-sensitive display that includes capturing the content on the touch-sensitive display at a point in time.
Figure 4B:
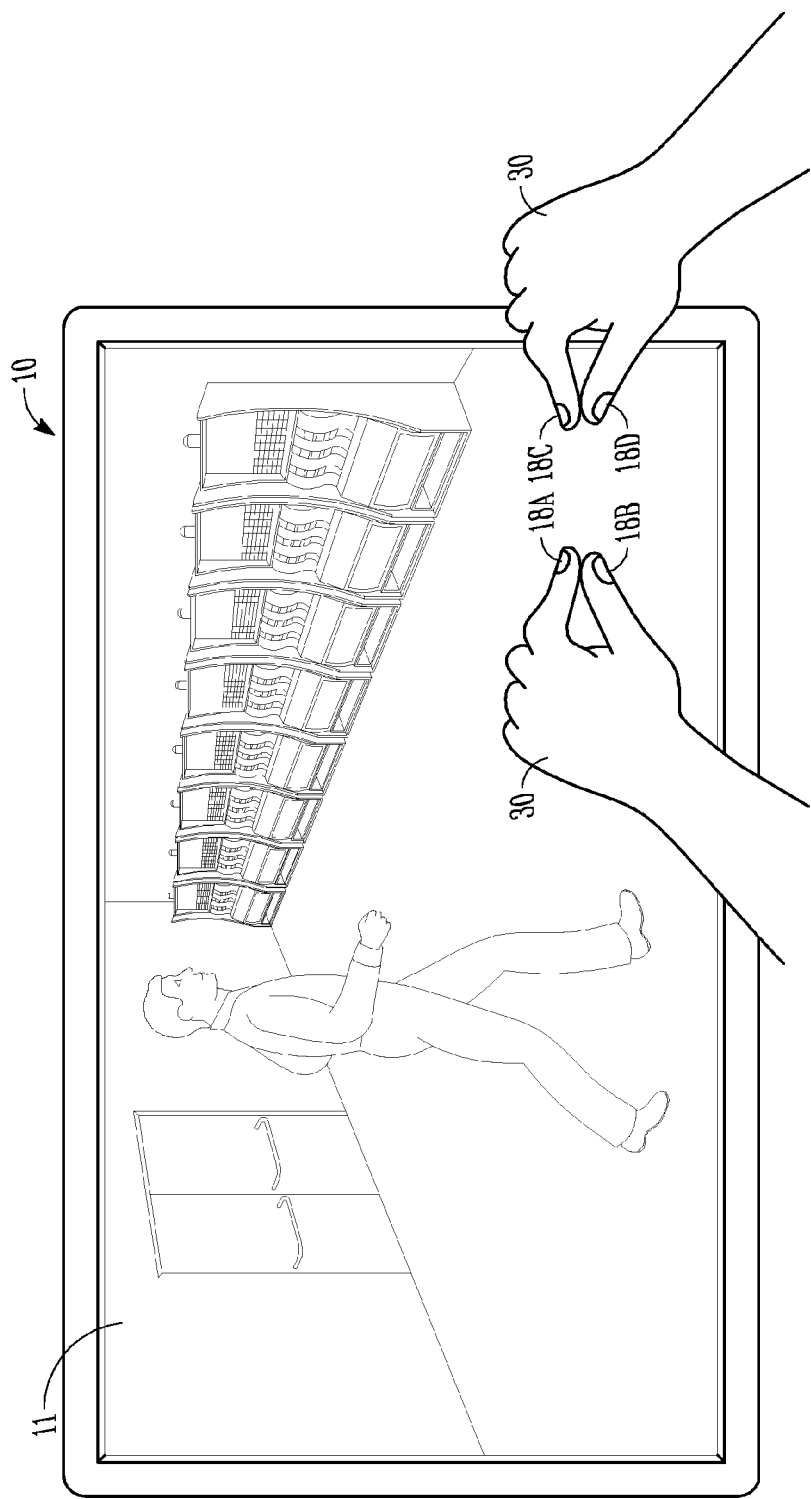

FIGS. 4A-4B illustrate an example embodiment of the method that includes detecting contact at four points 18A, 18B, 18C, 18D on the touch-sensitive display 10 (see FIG. 4A). The method further includes capturing the content 11 on the touch-sensitive display 10 at a point in time by bringing two of the four points of contact 18A, 18B together at the same time as bringing the other two points of contact 18C, 18D together (see FIG. 4B). The relative quickness of the gesture that is required to bring the two sets of points together in order to capture the content 11 will depend in part on the application where the method is to be used (among other factors).

FIGS. 5A-6B illustrate an example embodiment of the method that includes detecting contact with the touch-sensitive display 10 and manipulating the content 11 on the touch-sensitive display 10 by making a criss-cross gesture 33 on the touch-sensitive display 10. In some embodiments, manipulating the content 11 on the touch-sensitive display 10 by making a criss-cross gesture 33 may include closing a video 39 displayed on the touch-sensitive display 10.

Figure 5A:
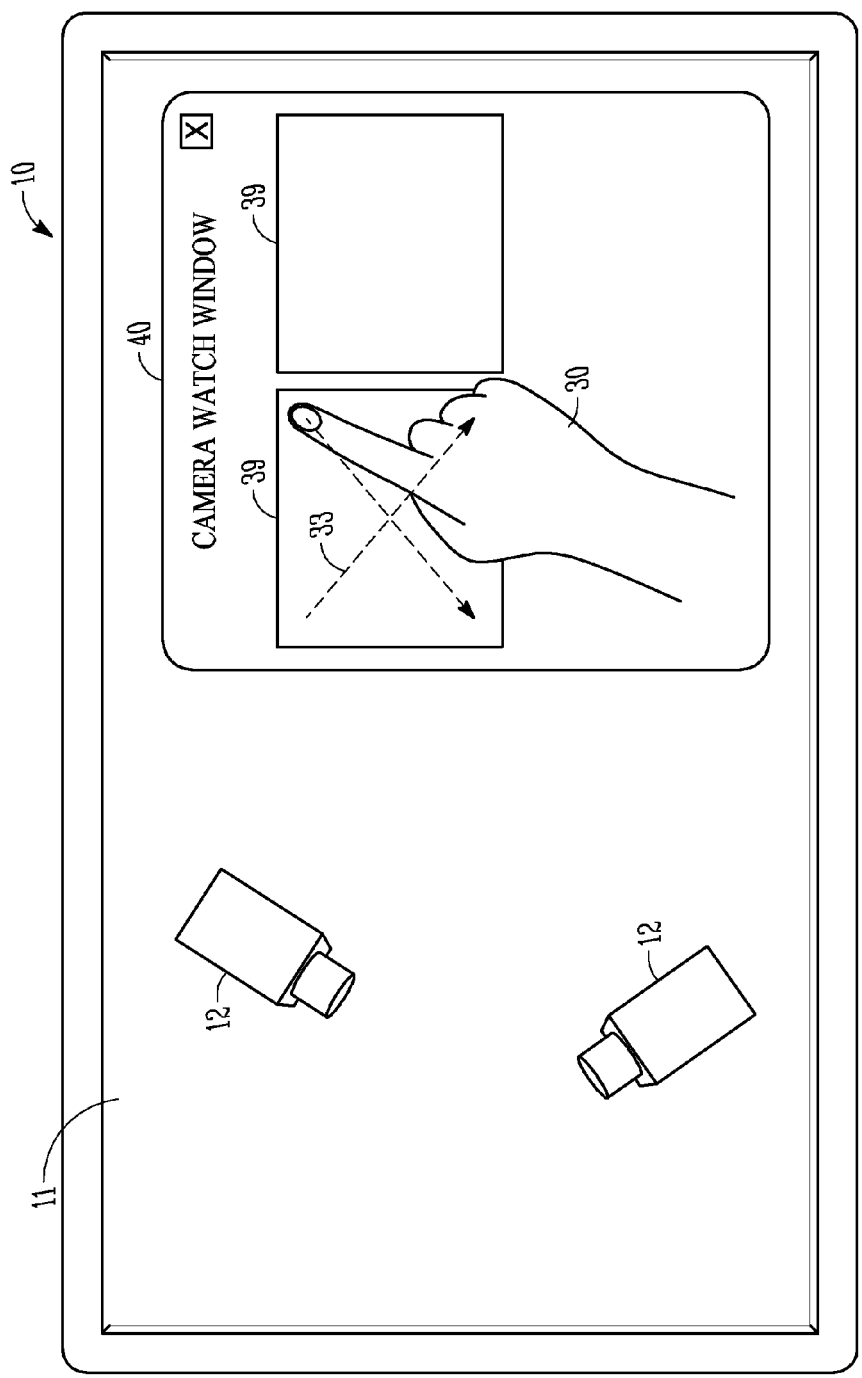
FIGS. 5A-5B illustrate an example method of showing content on a touch-sensitive display that includes manipulating content on the touch-sensitive display by making a criss-cross gesture on the touch-sensitive display.
Figure 5B:
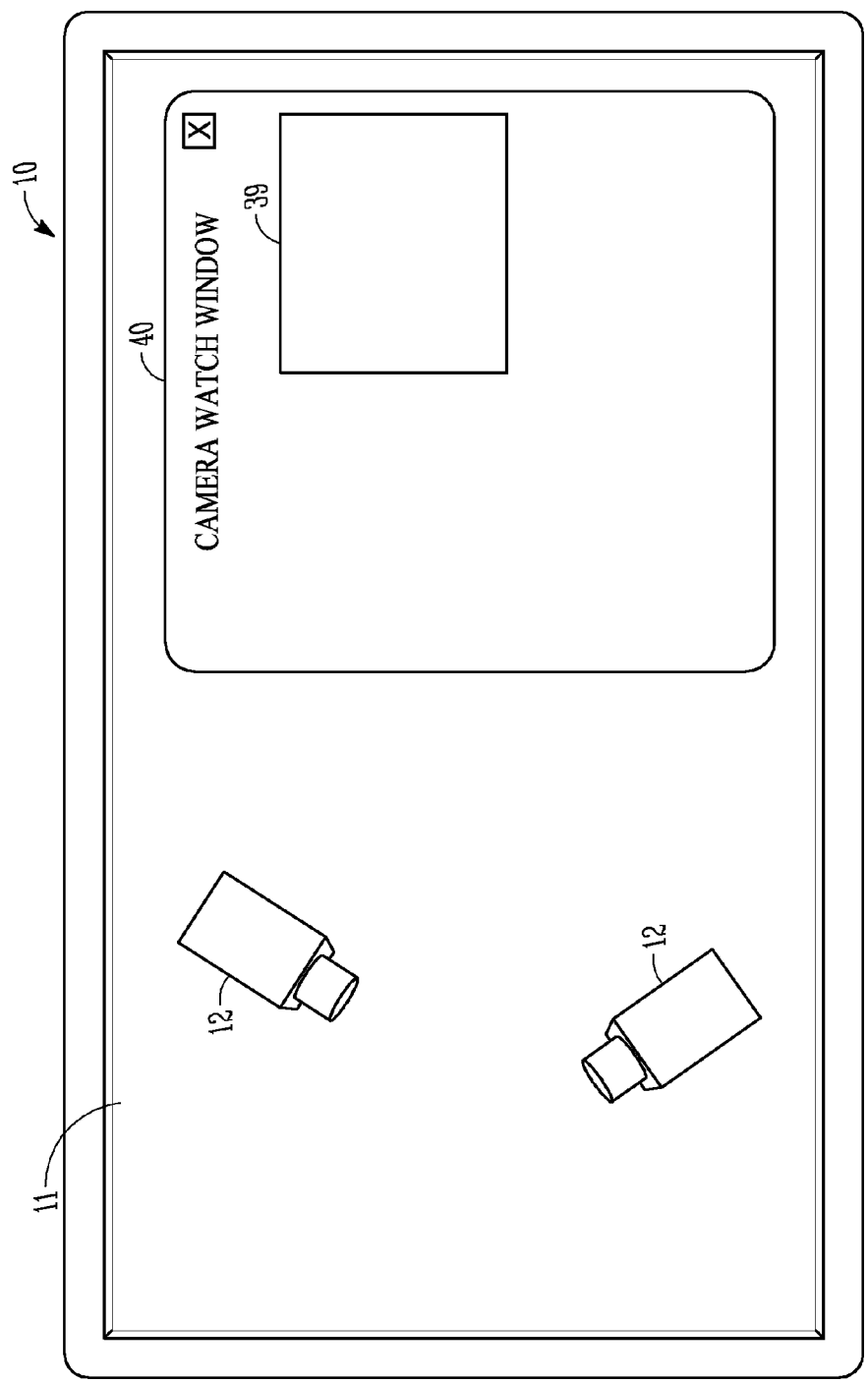

In the example embodiment that is illustrated in FIGS. 5A-5B, closing a video 39 displayed on the touch-sensitive display 10 includes closing one of a plurality of thumbnail videos 39 on the touch-sensitive display 10 (note one of thumbnail videos 39 is gone in FIG. 5B). It should be noted that one, some or all of the thumbnail videos 39 may be displayed as part of a window 40 on the touch-sensitive display 10.

Figure 6A:
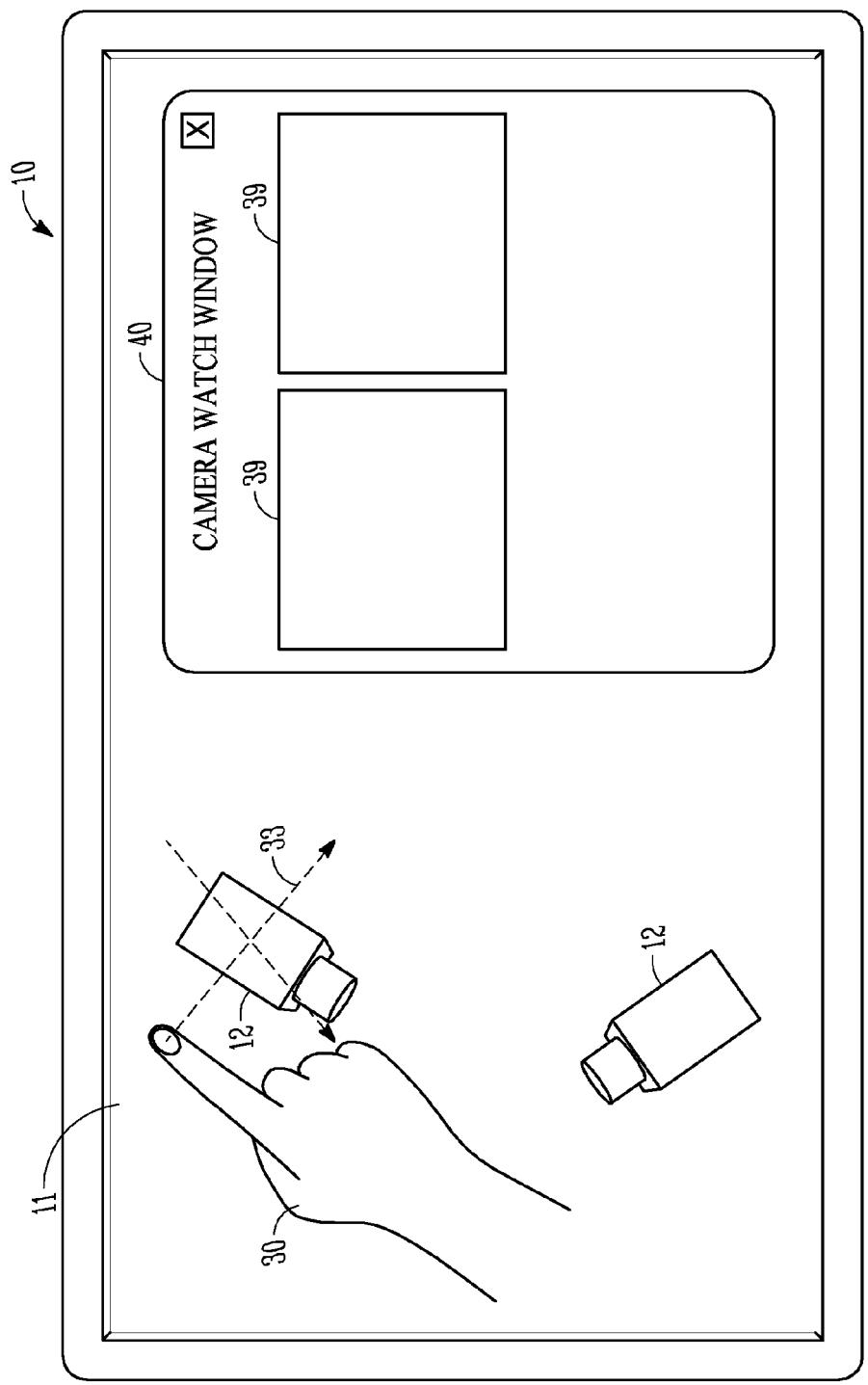
FIGS. 6A-6B illustrate another example method of showing content on a touch-sensitive display that includes manipulating content on the touch-sensitive display by making a criss-cross gesture on the touch-sensitive display.
Figure 6B:
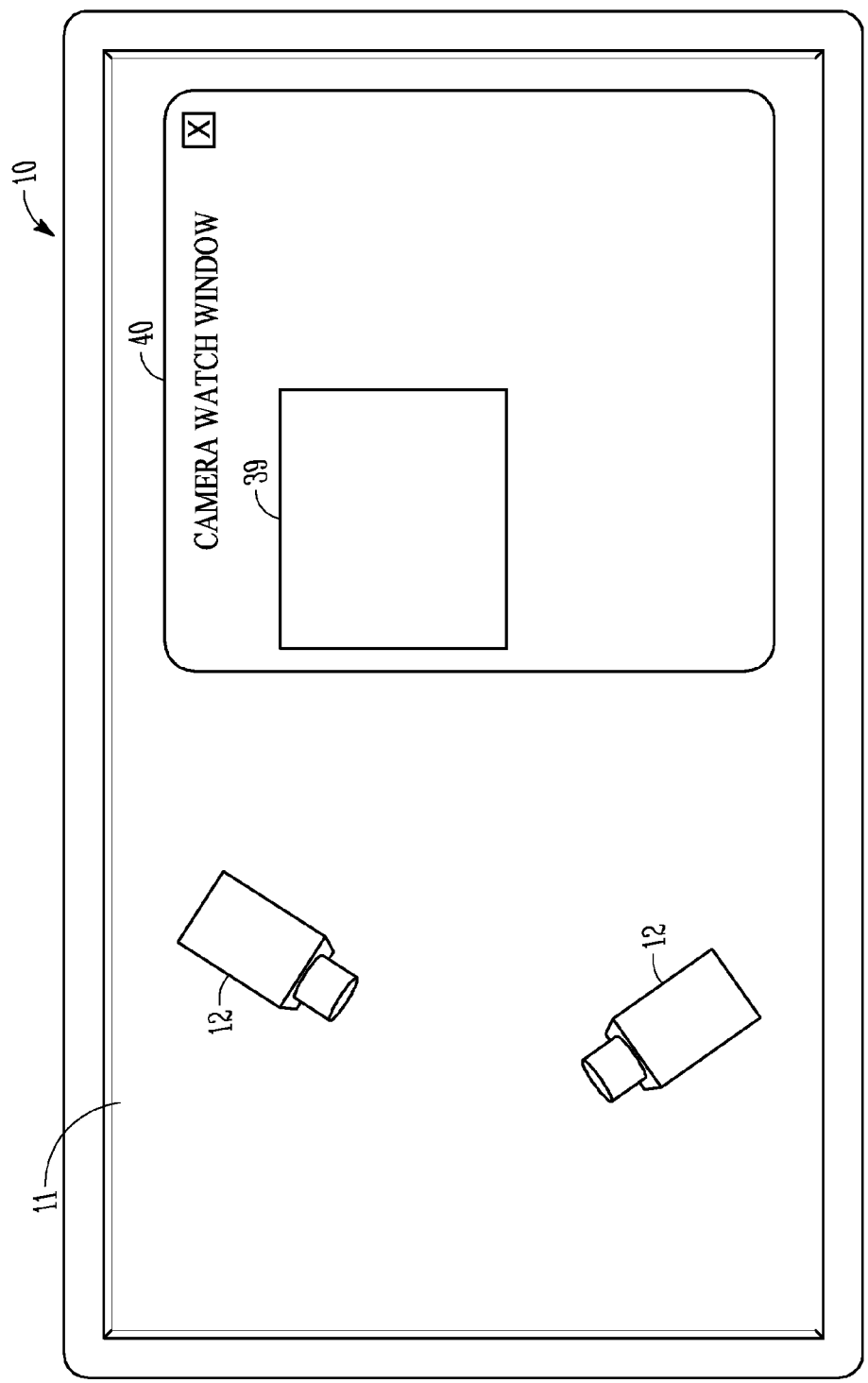

As shown in FIGS. 6A-6B, manipulating the content 11 on the touch-sensitive display 10 by making a criss-cross gesture 33 may include making the criss-cross gesture 33 over a camera 12 displayed on the touch sensitive display 10. In some embodiments, making the criss-cross gesture 33 over a camera 12 displayed on the touch sensitive display may include closing a video 39 that is displayed on the touch-sensitive display 10 where the video 39 is being captured by the camera 12. As an example, making the criss-cross gesture 33 over a camera 12 may include turning off power supplied to the camera 12 (note one of thumbnail videos 39 is gone in FIG. 6B).

It should be noted that the criss-cross gesture 33 may be used to manipulate the content 11 on the touch-sensitive display 10 in other ways. Some other examples include closing a window on the touch sensitive display 10 and/or selecting or deselecting any asset that is displayed on the touch sensitive display 10.

Figure 7A:
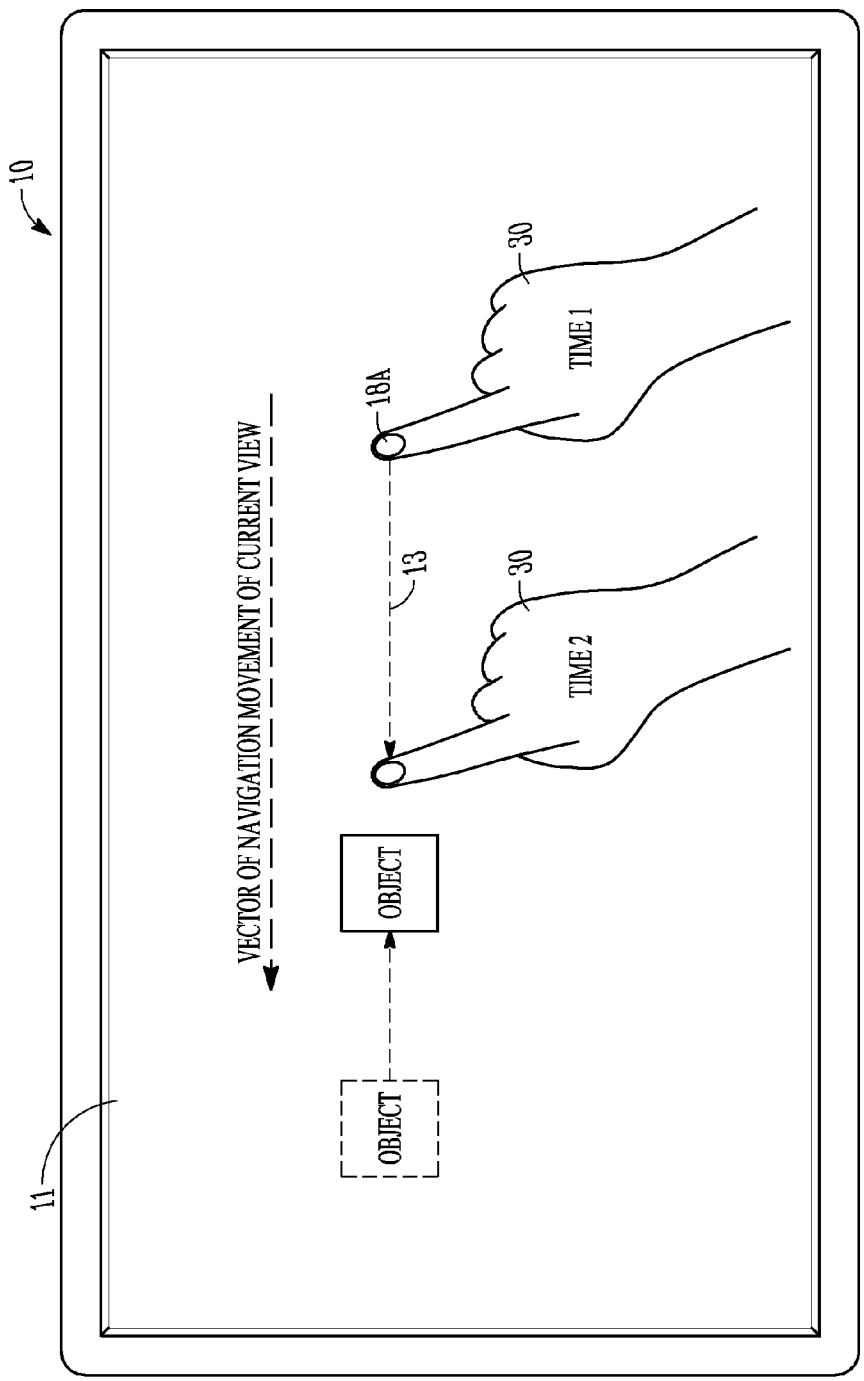
FIGS. 7A-7B illustrate an example method of showing content on a touch-sensitive display that includes moving content continuously on the touch-sensitive display by making a gesture on the touch-sensitive display.
Figure 7B:
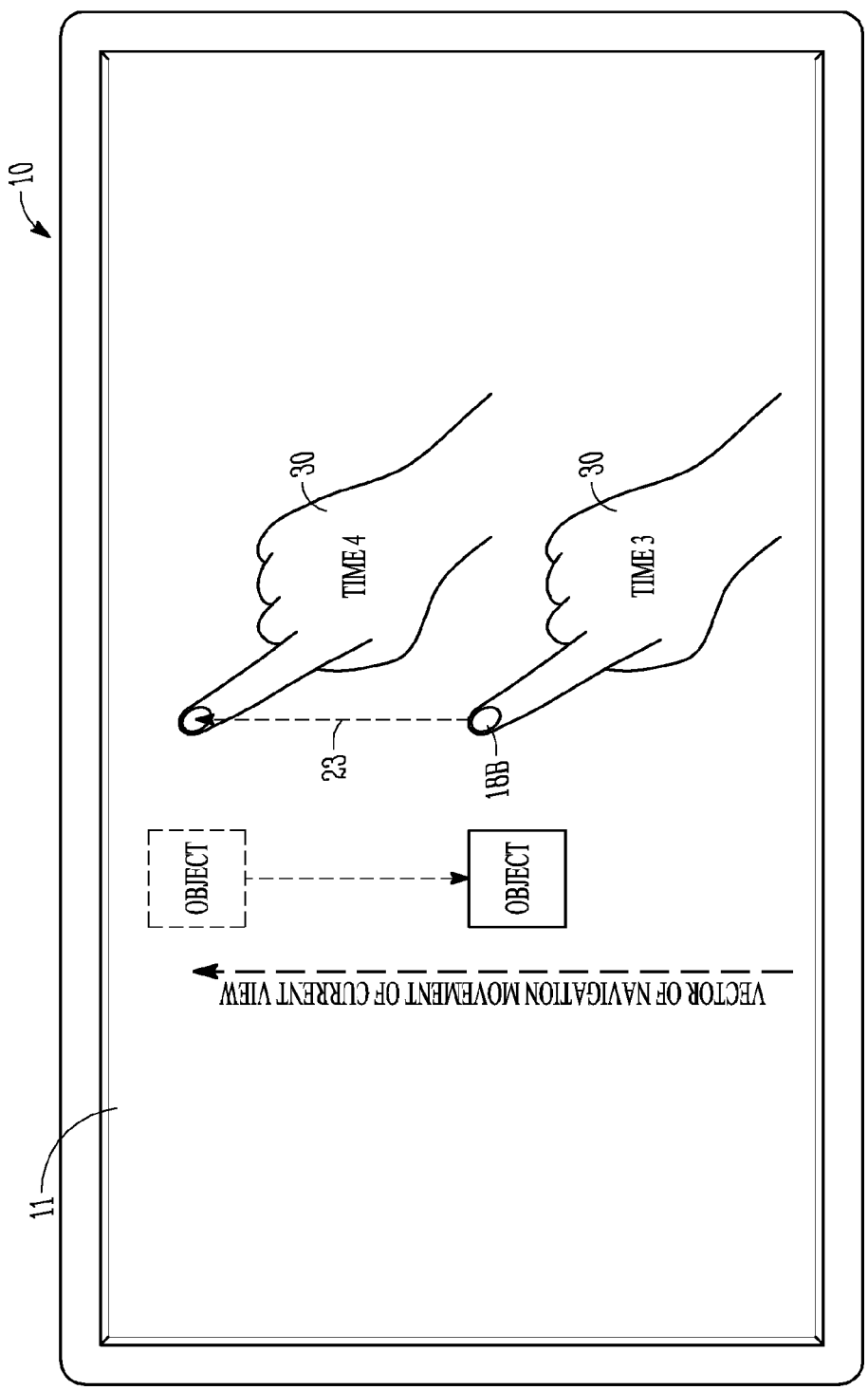

FIGS. 7A-7B illustrate an example embodiment of the method that includes detecting contact with the touch-sensitive display 10 (see, e.g., contact point 18A in FIG. 7A) and moving the content 11 continuously on the touch-sensitive display 10 by making a gesture 13 on the touch-sensitive display 10. The content 11 moves on the touch-sensitive display 10 until another contact is made with the touch-sensitive display (see, e.g., contact point 18B in FIG. 7B).

In the example embodiment illustrated in FIGS. 7A-7B, the content 11 moves continuously on the touch-sensitive display 10 in the same direction as the gesture 13. In addition, FIG. 7B shows that the contact which halts the motion of the content 11 in the original direction may be a second gesture 23 that is performed in a different direction than the original gesture 13.

Figure 8A:
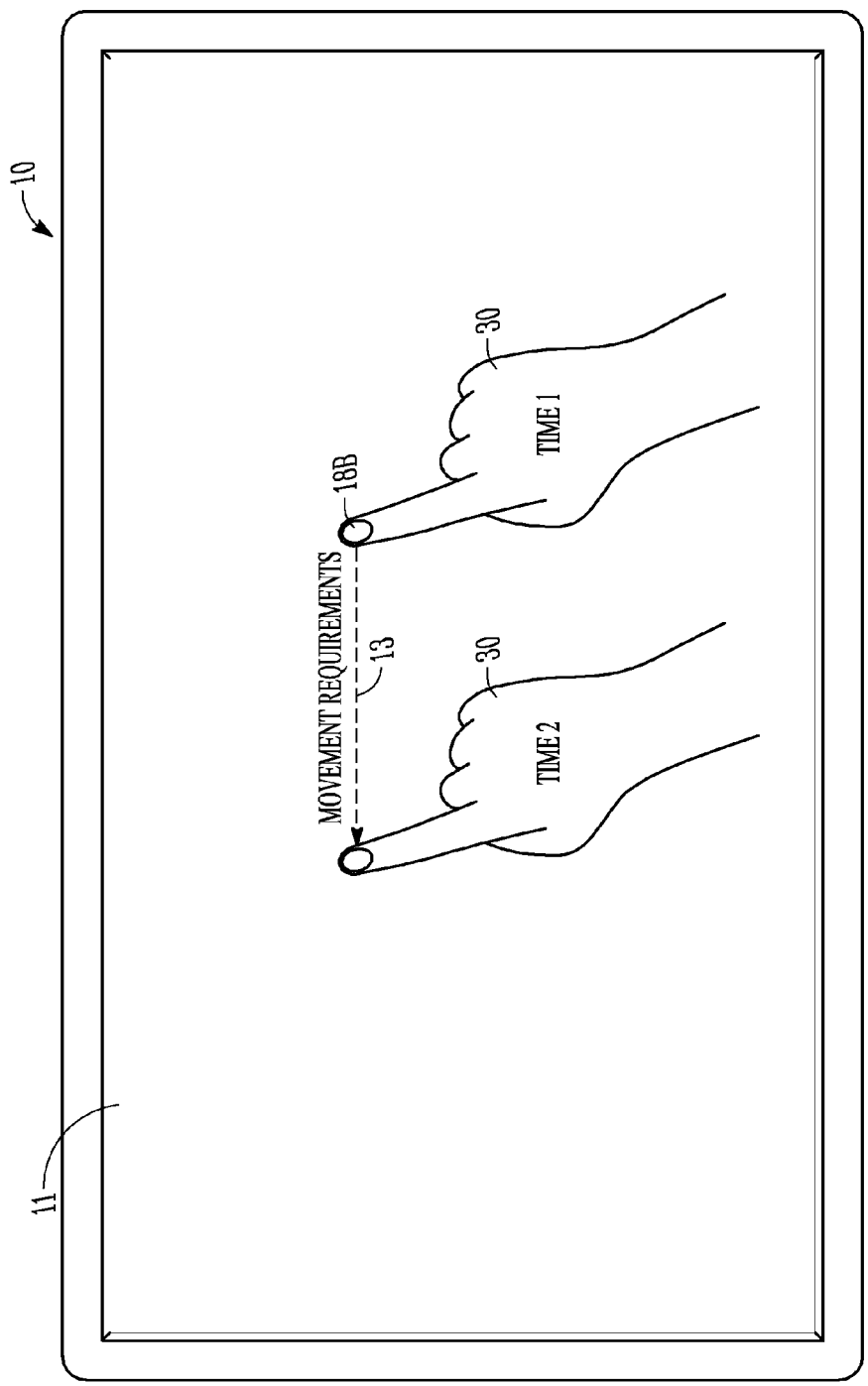
FIGS. 8A-8B illustrate an example method of showing content on a touch-sensitive display that includes making first and second gestures to move content at an increased speed on the touch-sensitive display.
Figure 8B:
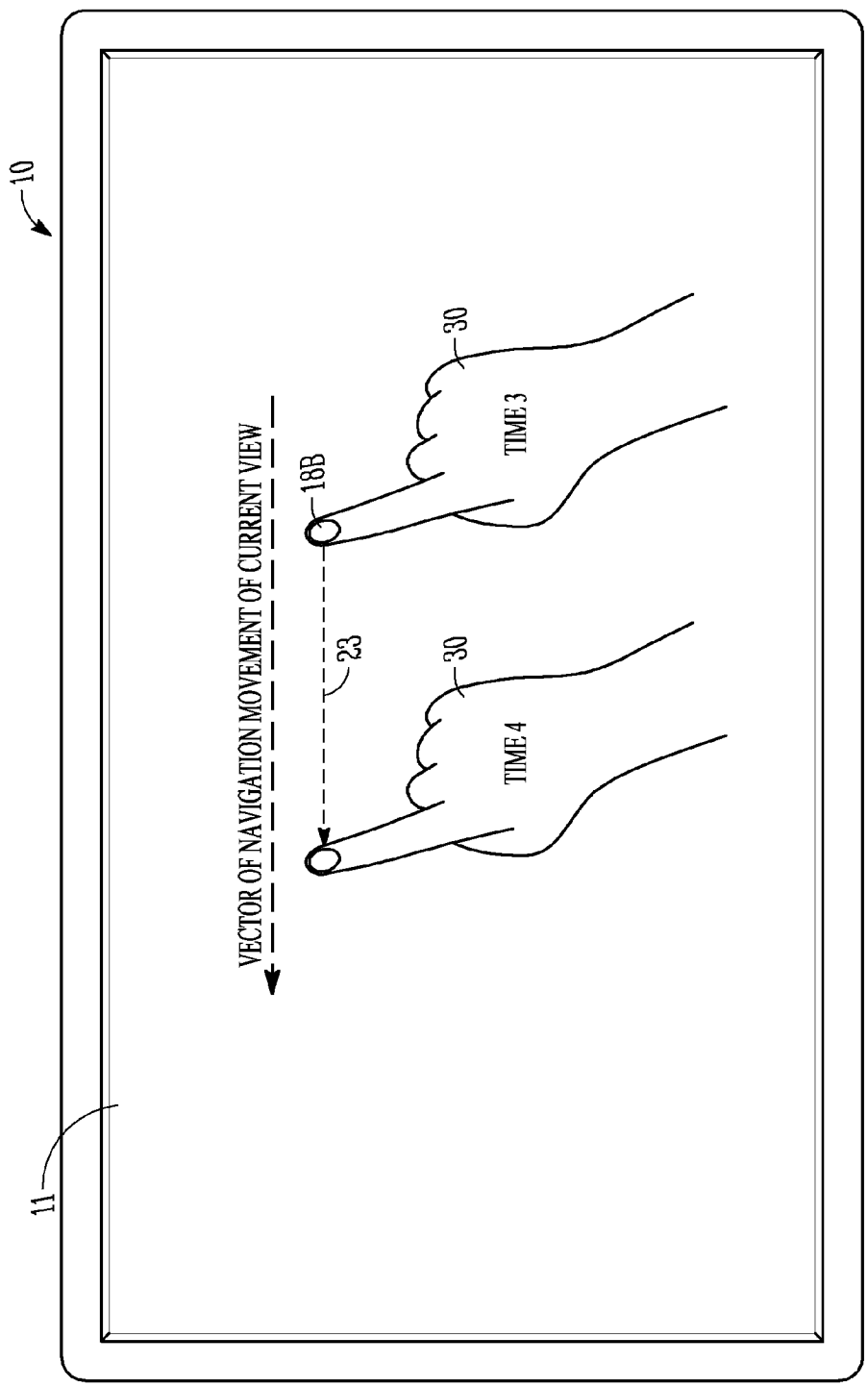

FIGS. 8A-8B illustrate another example embodiment of the method. In the example embodiment that is illustrated in FIGS. 8A-8B, the method includes detecting a first contact 18A with the touch-sensitive display 10 and moving the content 11 on the touch-sensitive display 10 by making a first gesture 13 from the first contact 18A on the touch-sensitive display 10 (see FIG. 8A). FIG. 8B illustrates that the method further includes detecting a second contact 18B with the touch-sensitive display 10 and moving the content 11 at an increased speed on the touch-sensitive display 10 by making a second gesture 23 from the second contact 18B on the touch-sensitive display 10.

In some embodiments, the first gesture 13 and the second gesture 23 are made in the same direction on the touch-sensitive display 10. In addition, the content 11 may move on the touch-sensitive display 10 in the same direction as the first and second gestures 13, 23.

The methods described herein may help security personnel to effectively support security monitoring and response tasks. Users can interact with a touch-sensitive display by using intuitive gestures that support performing tasks and activities such as monitoring un-related assets and/or responding to an incident. Users can effectively interact (i.e., view and/or adjust) with assets using a variety of single-touch and multi-touch gestures on the touch-sensitive display.

Figure 9:
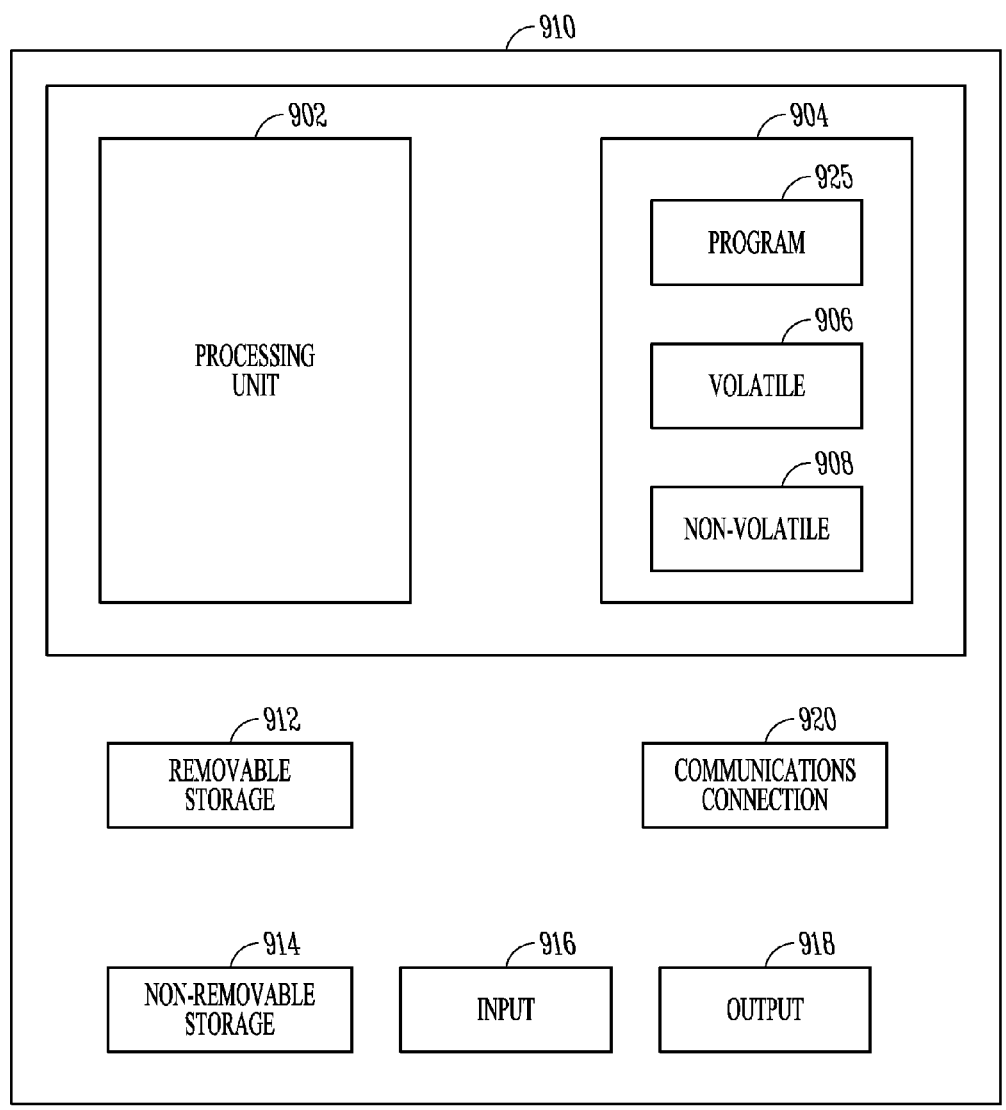
FIG. 9 is a block diagram of an example system for executing the methods described herein with reference to FIGS. 1-8.

A block diagram of a computer system that executes programming 925 for performing the above method is shown in FIG. 9. The programming may be written in one of many languages, such as virtual basic, Java and others. A general computing device in the form of a computer 910 may include a processing unit 902, memory 904, removable storage 912, and non-removable storage 914. Memory 904 may include volatile memory 906 and non-volatile memory 908. Computer 910 may include—or have access to a computing environment that includes—a variety of computer-readable media, such as volatile memory 906 and non-volatile memory 908, removable storage 912 and non-removable storage 914. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 910 may include or have access to a computing environment that includes input 916, output 918, and a communication connection 920. The input 916 may be a keyboard and mouse/touchpad, or other type of data input device, and the output 918 may be a display device or printer or other type of device to communicate information to a user. In one embodiment, a touch screen device may be used as both an input and an output device.

The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 902 of the computer 910. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A method of showing content on a touch-sensitive display comprising:

showing content on a touch-sensitive display, the content including a two dimensional map of an environment that includes cameras;

selecting an area on the touch-sensitive display that includes cameras by tracing a pattern on the touch-sensitive display around the area that includes the selected cameras; and displaying a new window on the touch-sensitive display that includes video generated by each of the selected cameras.

2. The method of claim 1, wherein displaying a new window that includes video generated by each of the selected cameras includes displaying a plurality of windows on the touch-sensitive display that includes video generated by each of the selected cameras where each camera provides video to a separate window.

3. The method of claim 1, wherein selecting selecting an area on the touch-sensitive display includes changing the size of the selected area on the touch-sensitive display that includes the cameras.

4. The method of claim 3, wherein changing the size of the selected area on the touch-sensitive display that includes the cameras includes contacting a displayed boundary of the selected area and manipulating the boundary to add or remove cameras.

* * * * *